(12) United States Patent
Hara et al.

(10) Patent No.: US 12,172,697 B2
(45) Date of Patent: Dec. 24, 2024

(54) VEHICLE FRONT SECTION STRUCTURE

(71) Applicant: TOYOTA JIDOSHA KABUSHIKI KAISHA, Toyota (JP)

(72) Inventors: Yasuhiro Hara, Nagoya (JP); Norimasa Koreishi, Miyoshi (JP); Jumpei Watanabe, Nagakute (JP); Hirotaka Ishioka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 285 days.

(21) Appl. No.: 17/843,575

(22) Filed: Jun. 17, 2022

(65) Prior Publication Data

US 2022/0402552 A1 Dec. 22, 2022

(30) Foreign Application Priority Data

Jun. 22, 2021 (JP) .................................. 2021-103516

(51) Int. Cl.
*B62D 21/02* (2006.01)
*B62D 21/11* (2006.01)
(Continued)

(52) U.S. Cl.
CPC ............ *B62D 21/152* (2013.01); *B62D 21/11* (2013.01); *B62D 25/04* (2013.01); *B62D 25/08* (2013.01)

(58) Field of Classification Search
CPC ........ B62D 21/02; B62D 21/03; B62D 21/04; B62D 21/05; B62D 21/11; B62D 21/15;
(Continued)

(56) References Cited

U.S. PATENT DOCUMENTS 5,364,128 A * 11/1994 Ide ........................ B62D 21/155
296/187.11
9,902,432 B2 * 2/2018 Yoshida ................. B62D 25/04
(Continued)

FOREIGN PATENT DOCUMENTS

EP 3613654 A1 * 2/2020 ............. B62D 21/02
JP S62-139787 U 9/1987
(Continued)

OTHER PUBLICATIONS

Description Translation for JP 2005/067268 from Espacenet (Year: 2005).*

(Continued)

*Primary Examiner* — Jason D Shanske
*Assistant Examiner* — Daniel M. Keck
(74) *Attorney, Agent, or Firm* — Dinsmore & Shohl LLP

(57) ABSTRACT

A vehicle front section structure includes left and right front side frame. A deformation portion configured to undergo compression deformation in the vehicle front-rear direction at a time of head-on collision of the vehicle is provided at a front end portion of each of the left and right front side frames. Left and right front side members that support a floor section of a vehicle cabin extend along the vehicle front-rear direction at a vehicle upper side with respect to the left and right front side frames. Front sections of the left and right front side members and the corresponding left and right deformation portions are connected by left and right coupling members. The left and right coupling members are configured so as to more readily undergo plastic deformation under collision load at a time of head-on collision than the left and right front side members.

12 Claims, 7 Drawing Sheets

(51) Int. Cl.
  *B62D 21/15* (2006.01)
  *B62D 25/04* (2006.01)
  *B62D 25/08* (2006.01)

(58) Field of Classification Search
  CPC .... B62D 21/152; B62D 21/155; B62D 25/04; B62D 25/08; B62D 25/082; B62D 25/085; B62D 25/20; B62D 33/06; B62D 47/02
  USPC .................................................. 280/781, 784
  See application file for complete search history.

(56) References Cited

U.S. PATENT DOCUMENTS

| | | | |
|---|---|---|---|
| 10,807,647 B2* | 10/2020 | Shin | B62D 21/152 |
| 11,987,289 B2* | 5/2024 | Saito | B60K 1/00 |
| 2008/0284151 A1 | 11/2008 | Mandel et al. | |
| 2013/0220718 A1* | 8/2013 | Gotou | B60K 1/00 180/65.6 |
| 2017/0106913 A1* | 4/2017 | Schmalzrieth | B62D 21/155 |
| 2017/0113533 A1* | 4/2017 | Abe | B60K 5/1241 |
| 2018/0118273 A1* | 5/2018 | McConnell | B62D 21/11 |
| 2019/0002026 A1* | 1/2019 | Ayukawa | B62D 25/082 |
| 2020/0062133 A1 | 2/2020 | Tsuruta et al. | |

FOREIGN PATENT DOCUMENTS

| | | | |
|---|---|---|---|
| JP | H10-316013 A | 12/1998 | |
| JP | 2005-067268 A | 3/2005 | |
| JP | 2007-168556 A | 7/2007 | |
| JP | 2011-020628 A | 2/2011 | |
| JP | 6471782 B1 * | 2/2019 | B62D 21/03 |
| JP | 2020-029134 A | 2/2020 | |
| WO | 2006/111311 A1 | 10/2006 | |
| WO | 2019/219179 A1 | 11/2019 | |

OTHER PUBLICATIONS

Description Translation for WO 2019/219179 from Espacenet (Year: 2019).*

* cited by examiner

VEHICLE FRONT SECTION STRUCTURE

CROSS-REFERENCE TO RELATED APPLICATION

This application is based on and claims priority under 35 USC 119 from Japanese Patent Application No. 2021-103516 filed on Jun. 22, 2021, the disclosure of which is incorporated by reference herein.

BACKGROUND

Technical Field

The present disclosure relates to a vehicle front section structure.

Related Art

In a vehicle body front section structure disclosed in Japanese Utility Model Application Publication (JP-Y) No. S62-139787, a front bumper is attached to a front end of a chassis frame (front side frames) through a bumper stay. The bumper stay has an accordion-shaped portion. Main sills (front side members) are disposed at a vehicle upper side of the front side frames further toward a vehicle rear side than the bumper stay. A front panel configuring a floor section of a driving seat is fixed to upper faces of the front side members. Front end portions of the front side members are joined to front end portions of the front side frames through a pair of cab hinge brackets (coupling members). A front cross member that is open toward a vehicle front side is joined to front ends of the front side members. A front member is joined to a front section of the front cross member. The front member includes a forward-extending portion formed with lateral beads.

In this vehicle body front section structure, in cases in which dynamic external force has acted on the vehicle body, the accordion-shaped portion of the bumper stay is compressed in a vehicle front-rear direction, or the lateral beads break, and dynamic external force is absorbed as a result. Since a range at the vehicle rear side of the accordion-shaped portion and the lateral beads is very strong in the vehicle front-rear direction, there is little damage thereto.

SUMMARY

In the above related art, dynamic external force toward the vehicle body is absorbed over a narrow range further toward the vehicle front side than the front side frames and the front cross members. However, if for example the vehicle were to collide at high speed, the collision load could not be fully absorbed within this range, and damage in a range further toward the vehicle rear side than this range would increase. Thus, there is room for improvement from the perspective of improving collision load absorption performance.

In consideration of the above circumstances, the present disclosure obtains a vehicle front section structure capable of improving collision load absorption performance.

A vehicle front section structure of a first aspect of the present disclosure includes left and right front side frames, left and right front side members, and left and right coupling members. The left and right front side frames extend along a vehicle front-rear direction at both side sections in a vehicle width direction of a front section of a vehicle, with a deformation portion configured to undergo compression deformation in the vehicle front-rear direction at a time of head-on collision of the vehicle provided at a front end portion of each of the front side frames. The left and right front side members extend along the vehicle front-rear direction at a vehicle upper side with respect to the left and right front side frames, and are configured to support a floor section of a vehicle cabin. The left and right coupling members connect front sections of the left and right front side members and the respective deformation portions, and are configured so as to more readily undergo plastic deformation under a collision load at a time of head-on collision than the left and right front side members.

In the first aspect, the deformation portions are respectively provided at the front end portions of the left and right front side frames that extend along the vehicle front-rear direction at both vehicle width direction side sections of the front section of the vehicle. The left and right deformation portions undergo compression deformation in the vehicle front-rear direction in a vehicle head-on collision. The left and right front side members extend along the vehicle front-rear direction at the vehicle upper side with respect to the left and right front side frames. The floor section of the vehicle cabin is supported by these front side members. The front sections of the left and right front side members and the corresponding left and right deformation portions are connected by the left and right coupling members. Thus, the front sections of the left and right front side members are supported by the left and right deformation portions through the left and right coupling members. The left and right coupling members are configured so as to more readily undergo plastic deformation under collision load at a time of head-on collision than the left and right front side members, and so undergo plastic deformation when the left and right deformation portions undergo compression deformation. Thus, even in configurations in which the left and right coupling members are connected to the corresponding left and right deformation portions, the left and right coupling members can be prevented from hindering compression deformation of the left and right deformation portions. This enables deformation stroke of the left and right deformation portions to be set longer in the vehicle front-rear direction. Moreover, the left and right coupling members can also be utilized as members to absorb collision load. This enables collision load absorption performance to be improved.

A vehicle front section structure of a second aspect of the present disclosure is the first aspect, wherein the left and right coupling members are oriented so as to slope with an upward gradient on progression toward a vehicle rear side.

In the second aspect, the left and right coupling members that connect between the deformation portions provided to front sections of the left and right front side frames and the front sections of the left and right front side members are oriented so as to slope with an upward gradient on progression toward the vehicle rear side. This enables upper end portions of the left and right coupling members to be coupled to vehicle front-rear direction intermediate portions of the front sections of the corresponding left and right front side members. This enables flexing of these intermediate portions to be suppressed under normal circumstances by the left and right coupling members.

A vehicle front section structure of a third aspect of the present disclosure is the second aspect, wherein a front cross member that extends along the vehicle width direction is joined to front end portions of the left and right front side members. End portions of the front cross member in the vehicle width direction are respectively supported by the left and right deformation portions via left and right pillar members. The left and right coupling members are disposed at the vehicle rear of the left and right pillar members, and span, as bracing, between the left and right pillar members and the corresponding left and right front side members.

In the third aspect, both vehicle width direction end portions of the front cross member that are joined to the front end portions of the left and right front side members are supported by the respective deformation portions of the left and right front side frames through the left and right pillar members. The left and right coupling members are disposed at the vehicle rear of the left and right pillar members, and span in the form of bracing between the left and right pillar members and the corresponding left and right front side members. This enables the left and right pillar members and the left and right front side members to be reinforced under normal circumstances by the left and right coupling members serving as bracing.

A vehicle front section structure of a fourth aspect of the present disclosure is the first aspect, wherein respective rear sections of the left and right front side frames and respective rear sections of the left and right front side members each include a kick section that slopes with a downward gradient on progression toward a vehicle rear side.

In the fourth aspect, in a vehicle head-on collision, the left and right front side frames and the left and right front side members undergo deformation at the respective kick sections sloped in the above-described manner. This deformation also enables collision load to be absorbed, thereby enabling collision load absorption performance to be further improved. Moreover, as a result of this deformation, the left and right front side frames and the left and right front side members are displaced obliquely toward the vehicle upper-rear side in a parallel or substantially parallel state. This enables the floor section of the vehicle cabin supported by the left and right front side members to be made to retreat obliquely toward the vehicle upper-rear side, namely toward the opposite side to an object that has collided with the vehicle. Occupant safety is better secured as a result.

A vehicle front section structure of a fifth aspect of the present disclosure is the fourth aspect, further including a power unit that is disposed between the left and right front side frames and that is supported by the left and right front side frames.

In the fifth aspect, the left and right front side frames and the left and right front side members undergo deformation at the respective kick sections in a vehicle head-on collision, and are displaced obliquely toward the vehicle upper-rear side in a parallel or substantially parallel state. When this occurs, the power unit disposed between the left and right front side frames and supported by the left and right front side frames is displaced obliquely toward the vehicle upper-rear side together with the floor section of the vehicle cabin supported by the left and right front side members. This enables the power unit to be prevented from crashing into the floor section of the vehicle cabin, thereby enabling damage to the power unit as a result of such a collision to be prevented.

A vehicle front section structure of a sixth aspect of the present disclosure is the fourth aspect, further including a cross member that connects front end portions of the respective kick sections of the left and right front side members in the vehicle width direction.

In the sixth aspect, the front end portions of the respective kick sections of the left and right front side members are connected in the vehicle width direction by the cross member. This for example enables the deformation at the respective kick sections of the left and right front side members to be stabilized.

A vehicle front section structure of a seventh aspect of the present disclosure is the sixth aspect, further including a seat frame that is configured to support a seat of the vehicle and has a front end portion supported by the cross member.

In the seventh aspect, the front end portion of the seat frame that supports the vehicle seat is supported by the cross member. In a vehicle head-on collision, the left and right front side members undergo deformation at the respective kick sections, and the cross member is displaced obliquely toward the vehicle upper-rear side together with the left and right front side members and the seat frame. This enables the seat supported by the seat frame to be made to retreat toward the opposite side to a colliding object.

A vehicle front section structure of an eighth aspect of the present disclosure is the first aspect, wherein each of the left and right front side members forms a closed cross-section together with the floor section, and each of the left and right coupling members includes a portion formed with an open cross-section.

Since the eighth aspect is configured as described above, the left and right coupling members are easily made to more readily undergo plastic deformation under collision load at a time of head-on collision than the left and right front side members.

As described above, the vehicle front section structure according to the present disclosure enables collision load absorption performance to be improved.

BRIEF DESCRIPTION OF THE DRAWINGS

Exemplary embodiments of the present disclosure will be described in detail based on the following figures, wherein.

DETAILED DESCRIPTION

Figure 1:
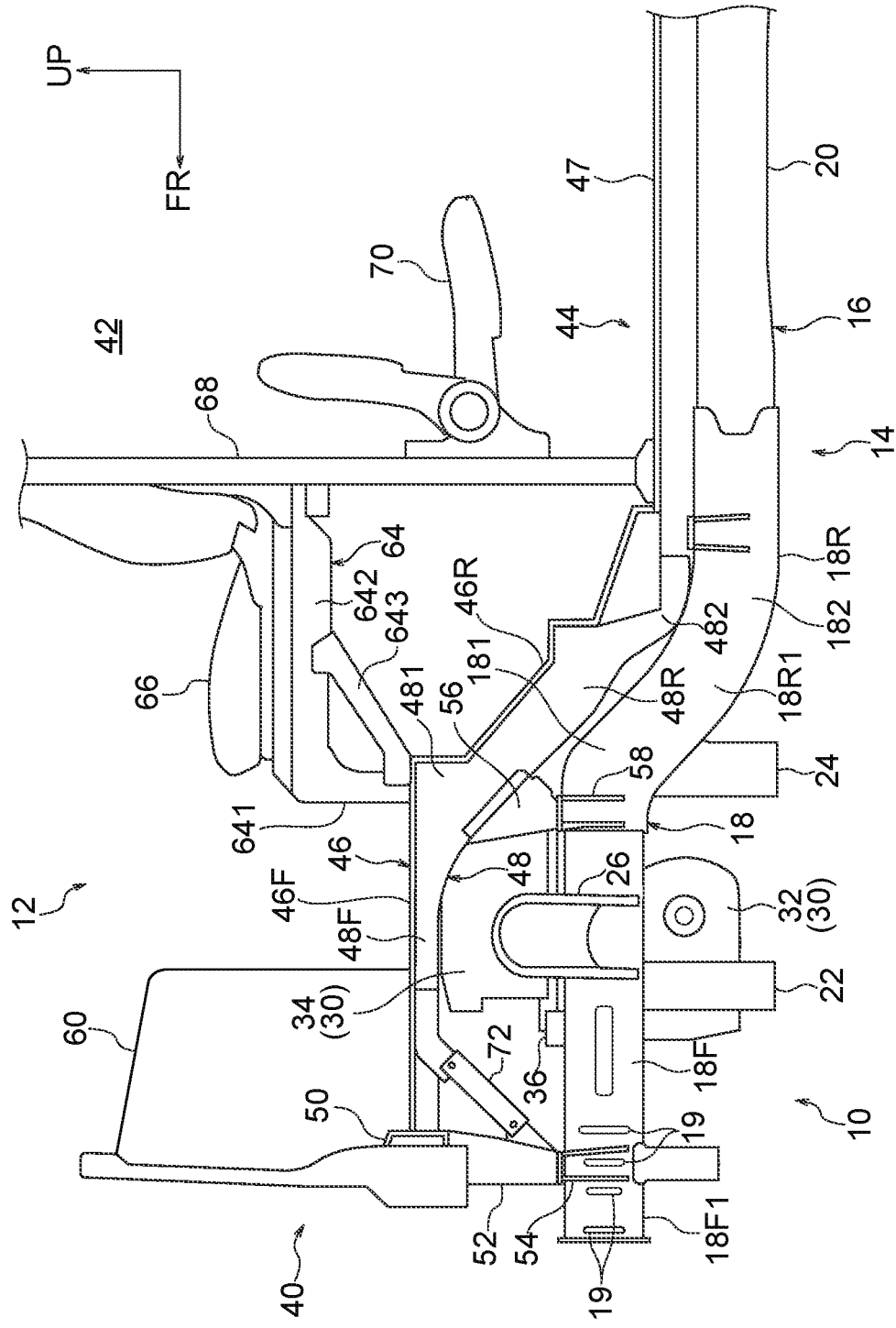
FIG. 1 is a side view illustrating part of a configuration of a front section of a vehicle applied with a vehicle front section structure according to an exemplary embodiment.

Explanation follows regarding a vehicle front section structure 10 according to an exemplary embodiment of the present disclosure, with reference to FIG. 1 to FIG. 9. Note that some of the reference numerals may be omitted from the drawings in order to facilitate viewing of the drawings. In the respective drawings, the arrow FR, the arrow LH, and the arrow UP respectively indicate a vehicle front side (direction of progress), a vehicle left side, and a vehicle upper side, as appropriate. Moreover, unless specifically stated otherwise, simple reference to front and rear, left and right, and up and down directions refers to front and rear in a vehicle front-rear direction, left and right in a vehicle left-right direction (vehicle width direction), and up and down in a vehicle vertical direction.

Configuration

As illustrated in FIG. 1 to FIG. 5, a vehicle 12 applied with the vehicle front section structure 10 according to the present exemplary embodiment is what is referred to as a body-on-frame vehicle in which a vehicle body 40 is supported by a ladder frame 14. As an example, the vehicle 12 is a bus. Although not illustrated in the drawings, the vehicle body 40 of the vehicle 12 has a substantially rectangular block-shaped external profile. As an example, the vehicle 12 is an electric vehicle. First, explanation follows regarding an outline of a framework structure of the vehicle 12.

The ladder frame 14 includes a left and right pair of side frames 16 and plural cross members 22, 24. The left and right side frames 16 extend along the front-rear direction at both vehicle width direction side sections of the vehicle 12. The plural cross members 22, 24 each extend along the vehicle width direction so as to be arrayed in the front-rear direction with a spacing therebetween. The left and right side frames 16 are connected in the vehicle width direction by the plural cross members 22, 24.

The left and right side frames 16 are respectively configured by left and right front side frames 18, left and right central side frames 20, and left and right rear side frames (not illustrated in the drawings). The left and right front side frames 18 extend along the front-rear direction at both vehicle width direction side sections of a front section of the vehicle 12. The left and right central side frames 20 extend along the front-rear direction at both vehicle width direction side sections of a front-rear direction central section of the vehicle 12. The left and right rear side frames extend along the front-rear direction at both vehicle width direction side sections of a rear section of the vehicle 12. The front side frames 18, the central side frames 20, and the rear side frames are each formed in an angular tube shape using a steel material or the like, and each have a rectangular closed cross-section profile as viewed along the front-rear direction. Note that plural non-illustrated cross members are also provided between the left and right central side frames 20, and between the left and right rear side frames.

A front section 18F of each of the left and right front side frames 18 extends in a straight line along the front-rear direction. A front end portion of each of the front sections 18F (namely, a front end portion of each of the left and right front side frames 18) configures a deformation portion 18F1 that undergoes axial compression deformation in the front-rear direction at a time of head-on collision of the vehicle 12. Plural beads 19 that extend along the vertical direction as an example are formed arrayed along the front-rear direction on left and right side faces of each of the deformation portions 18F1. The deformation portions 18F1 are therefore weaker with respect to load in the front-rear direction than other locations of the respective front sections 18F. Front-rear direction intermediate portions of the respective front sections 18F are connected in the vehicle width direction by the cross member 22. A suspension tower 26 is fixed to a vehicle width direction outer face of each of the front sections 18F.

A front side portion of a rear section 18R of each of the left and right front side frames 18 configures a kick section 18R1 that slopes with a downward gradient on progression toward the rear side. A rear side portion of the rear section 18R extends in a straight line along the front-rear direction. Each of the rear sections 18R is bent into substantially a crank shape at bend portions 181, 182 on both front and rear sides of the kick section 18R1. The bend portion 181 on the front side is bent so as to bulge toward the upper-rear side, whereas the bend portion 182 on the rear side is bent so as to bulge toward the lower-front side. Front portions of the respective kick sections 18R1 (namely, front portions of the respective rear sections 18R) are connected in the vehicle width direction by the cross member 24. Front end portions of the left and right central side frames 20 are joined to rear end portions of the respective rear sections 18R.

A motor 32 for causing the vehicle 12 to travel is disposed between the left and right front side frames 18. The motor 32 is supported by the left and right front side frames 18 through the cross members 22, 24 and a non-illustrated support member or the like. An electronic unit 34 that controls power supplied to the motor 32 is disposed above the motor 32. The electronic unit 34 is supported by the left and right front side frames 18 through a support frame 36. As an example, the support frame 36 includes a front and rear pair of cross frame sections (not allocated reference numerals) that span between the left and right front side frames 18, and a left and right pair of side frame sections (not allocated reference numerals) that span between the front and rear cross frame sections, so as to have a ladder shape in plan view. The motor 32 and the electronic unit 34 configure a power unit 30.

The vehicle body 40 is supported from the lower side by the ladder frame 14 with the above configuration. The vehicle body 40 includes floor paneling 44 configuring floor sections of a vehicle cabin 42. The floor paneling 44 includes a front floor panel 46 configuring a floor section at a front section of the vehicle cabin 42, a central floor panel 47 configuring a floor section at a front-rear direction intermediate section of the vehicle cabin 42, and a rear floor panel (not illustrated in the drawings) configuring a floor section at a rear section of the vehicle cabin 42. The front floor panel 46, the central floor panel 47, and the rear floor panel are each configured of sheet steel or the like.

A front section of the front floor panel 46 configures a driving seat floor section 46F extending along the front-rear direction and the vehicle width direction. A rear section of the front floor panel 46 configures a sloped section 46R that slopes with a downward gradient on progression toward the vehicle rear side. The driving seat floor section 46F is disposed spaced apart from and at the upper side with respect to the front sections 18F of the left and right front side frames 18, and the sloped section 46R is disposed spaced apart from and at the upper side with respect to the rear sections 18R of the left and right front side frames 18. The above-mentioned electronic unit 34 is disposed below the driving seat floor section 46F. A front end portion of the central floor panel 47 is joined to a rear end portion of the sloped section 46R. The central floor panel 47 extends along the front-rear direction and the vehicle width direction. A non-illustrated battery that stores power for supply to the above-mentioned motor 32 is disposed below the central floor panel 47.

Figure 6:
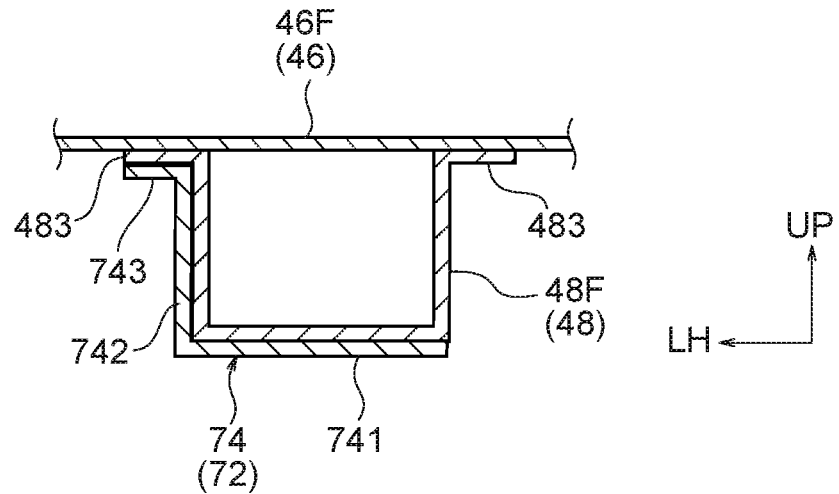
FIG. 6 is a cross-section sectioned along line F6-F6 in FIG. 5.
Figure 7:
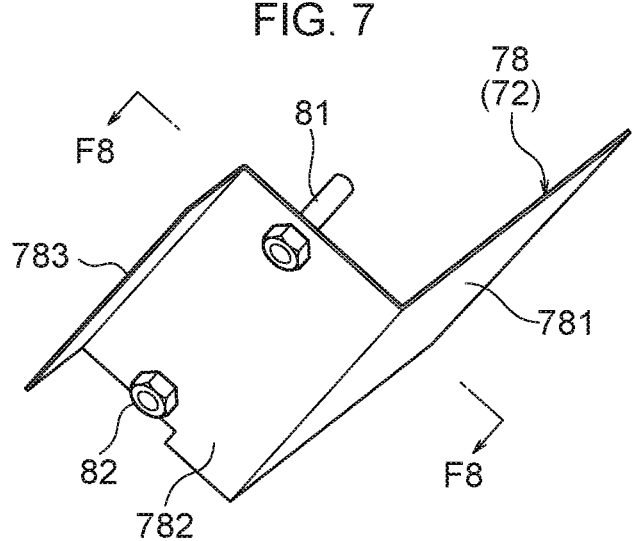
FIG. 7 is a perspective view illustrating part of a coupling member included in the vehicle.
Figure 8:
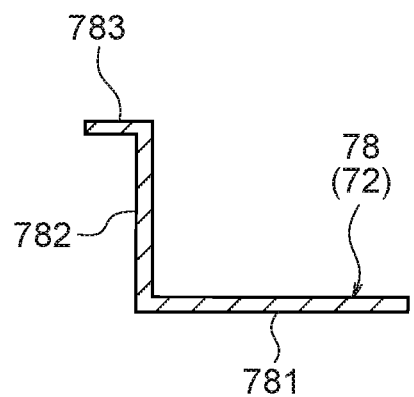
FIG. 8 is a cross-section sectioned along line F8-F8 in FIG. 7.
Figure 9:
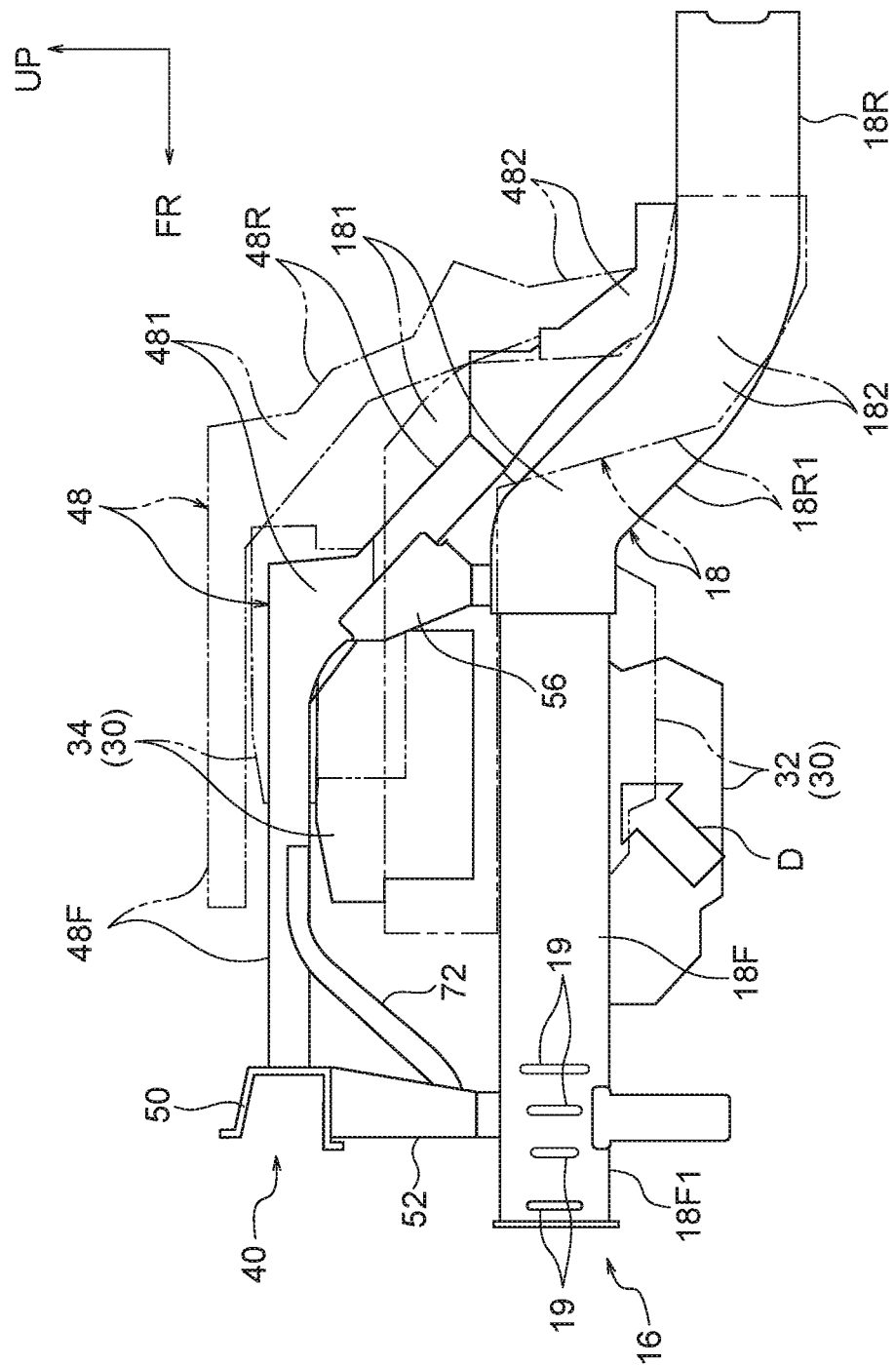
FIG. 9 is a schematic side view corresponding to part of FIG. 1 for explaining deformation of a vehicle front section at a time of head-on collision.

The front floor panel 46 is supported by the left and right front side frames 18 through a left and right pair of front side members 48. The left and right front side members 48 extend along the front-rear direction at the upper side and vehicle width direction outside with respect to the left and right front side frames 18. The left and right front side members 48 are each manufactured by for example pressing sheet steel, and are joined to a lower face of the front floor panel 46 by welding. Specifically, as illustrated in FIG. 6, each of the front side members 48 has a hat-shaped cross-section profile open toward the upper side as viewed along the front-rear direction, and is joined to the lower face of the front floor panel 46 at left and right flanges 483 provided at upper end portions of the front side member 48. Thus, a closed cross-section extending along the vehicle front-rear direction is formed by each of the front side members 48 and the front floor panel 46.

A front section 48F of each of the left and right front side members 48 extends in a straight line along the front-rear direction, and is joined to a lower face of the driving seat floor section 46F of the front floor panel 46. A rear section 48R of each of the left and right front side members 48 configures a kick section 48R that slopes with a downward gradient on progression toward the vehicle rear side, and is joined to a lower face of the sloped section 46R of the front floor panel 46. Each of the kick sections 48R is bent into substantially a crank shape at bend portions 481, 482 at both front and rear sides. The bend portion 481 on the front side is bent so as to bulge toward the upper-rear side, whereas the bend portion 482 on the rear side is bent so as to bulge toward the lower-front side.

A front cross member 50 that extends along the vehicle width direction is disposed at front end portions of the left and right front side members 48. The front cross member 50 is configured of sheet steel or the like, and has a hat-shaped cross-section profile open toward the front side as viewed along the vehicle width direction. A flange that for example overlays a rear face of the front cross member 50 is provided at the front end portion of each of the left and right front side members 48, and the flange is fixed to the rear face of the front cross member 50 by bolt-fastening. The front end portions of the left and right front side members 48 are thereby connected in the vehicle width direction by the front cross member 50.

Both vehicle width direction end portions of the front cross member 50 are supported by the front end portions (namely, the respective deformation portions 18F1) of the left and right front side frames 18 through left and right front pillar members 52. The left and right front pillar members 52 correspond to "left and right pillar members" of the present disclosure. Each of the left and right front pillar members 52 is for example formed by pressing sheet steel, and has a box shape open toward the front and upper sides. For example, a non-illustrated flange formed to an upper end portion of each of the front pillar members 52 is fixed to the front cross member 50 by welding or bolt-fastening. A lower end portion of each of the front pillar members 52 is fixed to the corresponding front side frame 18 through a bracket 54. The bracket 54 is fixed to a vehicle width direction outside face of the corresponding deformation portion 18F1 by welding. The front pillar member 52 is mounted on an upper face of the corresponding bracket 54, and is fixed to the bracket 54 by bolt-fastening.

Front end portions of the respective kick sections 48R of the left and right front side members 48 are supported by the left and right front side frames 18 through left and right rear pillar members 56. Each of the left and right rear pillar members 56 is for example formed by pressing sheet steel, and has a box shape open toward the vehicle width direction center side and the upper side. For example, a flange formed to an upper end portion of each of the rear pillar members 56 is fixed to the front end portion of the corresponding kick section 48R by welding. A lower end portion of each of the rear pillar members 56 is fixed to the corresponding front side frame 18 through a bracket 58. The bracket 58 is fixed to a vehicle width direction outside face of the front end portion of the corresponding kick section 48R by welding. The corresponding rear pillar member 56 is mounted on an upper face of the bracket 58, and is fixed to the bracket 58 by bolt-fastening.

The left and right front side members 48 are supported from the lower side by the left and right front side frames 18 through the front cross member 50, the front pillar members 52, the brackets 54, the rear pillar members 56, and the brackets 58. The front floor panel 46 is supported from the lower side by the left and right front side members 48. An instrument panel 60 is mounted and fixed to an upper face of the front section of the front floor panel 46.

Figure 2:
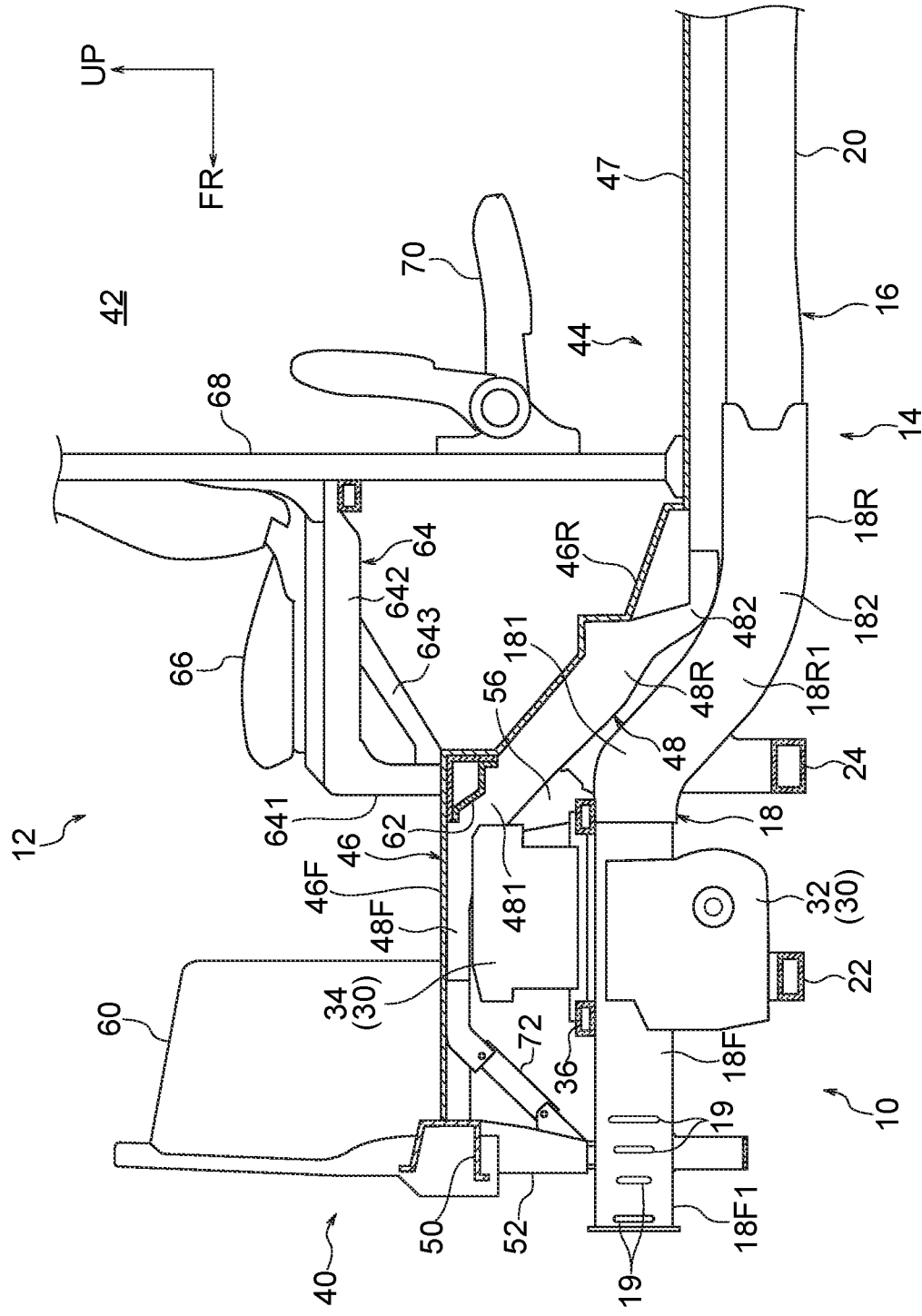
FIG. 2 is a cross-section illustrating a state in which the configuration illustrated in FIG. 1 has been sectioned slightly further toward a vehicle width direction center side than a front side frame on a vehicle left side.
Figure 3:
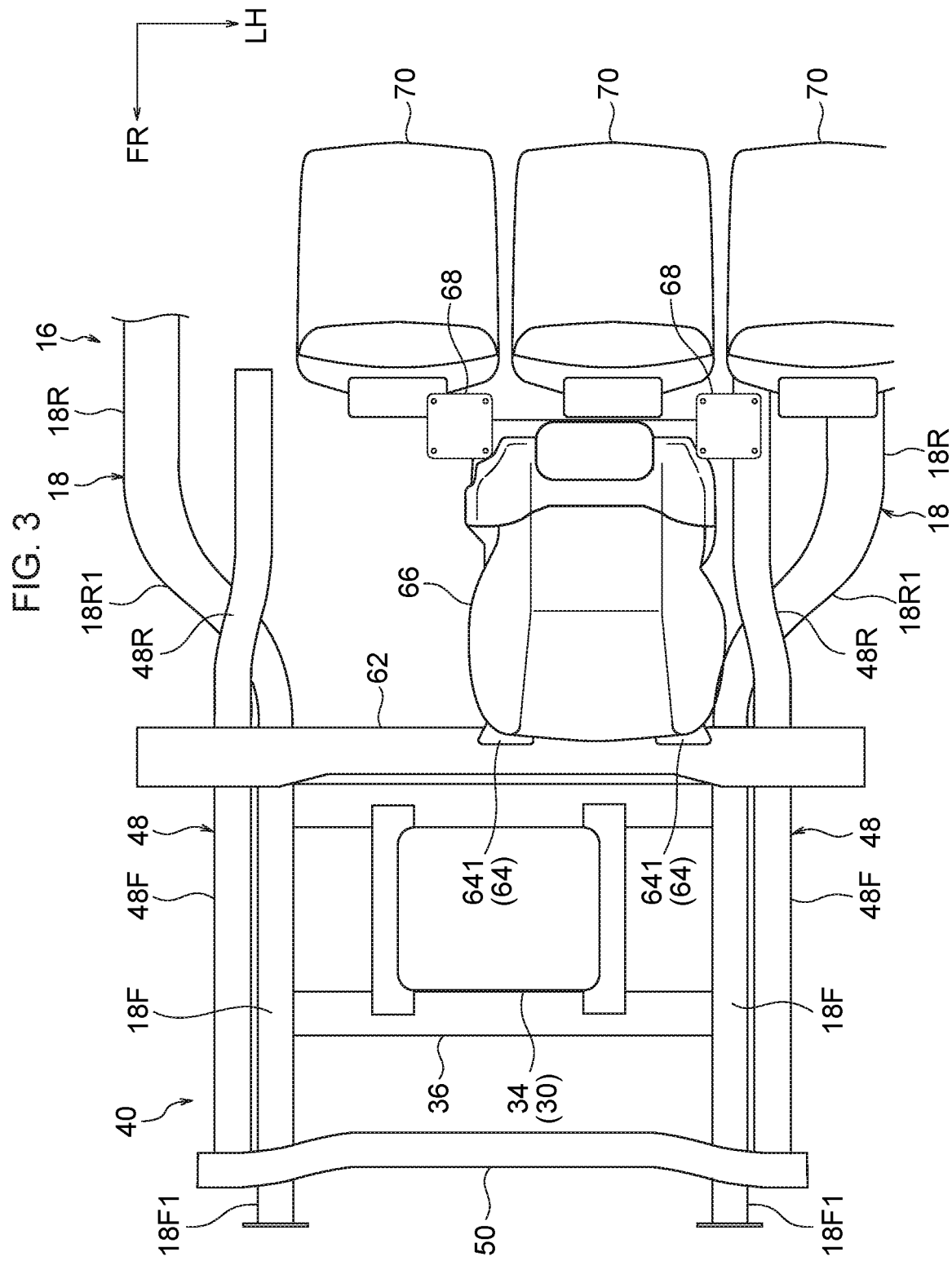
FIG. 3 is a plan view illustrating part of the configuration of the front section of the vehicle.

The front end portions of the respective kick sections 48R of the left and right front side members 48 are connected in the vehicle width direction by a seat cross member 62 (see FIG. 2 and FIG. 3). The seat cross member 62 corresponds to a "cross member" of the present disclosure. The seat cross member 62 is for example formed in an angular tube shape using a steel material, and extends along the vehicle width direction. Both vehicle width direction end portions of the seat cross member 62 are joined to the front end portions of the respective kick sections 48R by welding. A rear end portion of the driving seat floor section 46F is joined to an upper face of the seat cross member 62 by welding. The seat cross member 62 supports a front end portion of a seat frame 64 from the lower side.

The seat frame 64 is a frame that supports a driving seat 66, configuring a seat of the vehicle 12, from the lower side. The seat frame 64 includes a left and right pair of vertical sections 641 extending along the vertical direction, and a horizontal section 642 extending rearward from upper end portions of the left and right vertical sections 641. Brace portions 643 span in the form of bracing between lower end portions of the vertical sections 641 and front-rear direction intermediate portions of the horizontal section 642. The lower end portions of the vertical sections 641 are fixed to the rear end portion of the driving seat floor section 46F and to the seat cross member 62 by bolt-fastening. A rear end portion of the horizontal section 642 is fixed to vertical direction intermediate portions of a left and right pair of support pillars 68 that project upward from the front end portion of the central floor panel 47.

The left and right support pillars 68 are for example each formed in an angular tube shape using a steel material or the like, extend along the vertical direction, and are arrayed in the vehicle width direction with a spacing therebetween. Plural passenger seats 70 are disposed at the rear side of the left and right support pillars 68. The plural passenger seats 70 are arranged in a row along the vehicle width direction, and are fixed to the left and right support pillars 68 through brackets or the like. Although not illustrated in the drawings, plural other passenger seats are provided in a rear area inside the vehicle cabin 42.

As illustrated in FIG. 1, FIG. 2, FIG. 4, and FIG. 5, in the vehicle front section structure 10 according to the present exemplary embodiment, the deformation portions 18F1 of the left and right front side frames 18 and the corresponding front sections 48F of the left and right front side members 48 are connected by left and right coupling members 72. As an example, the vehicle front section structure 10 is configured with left-right symmetry.

Figure 4:
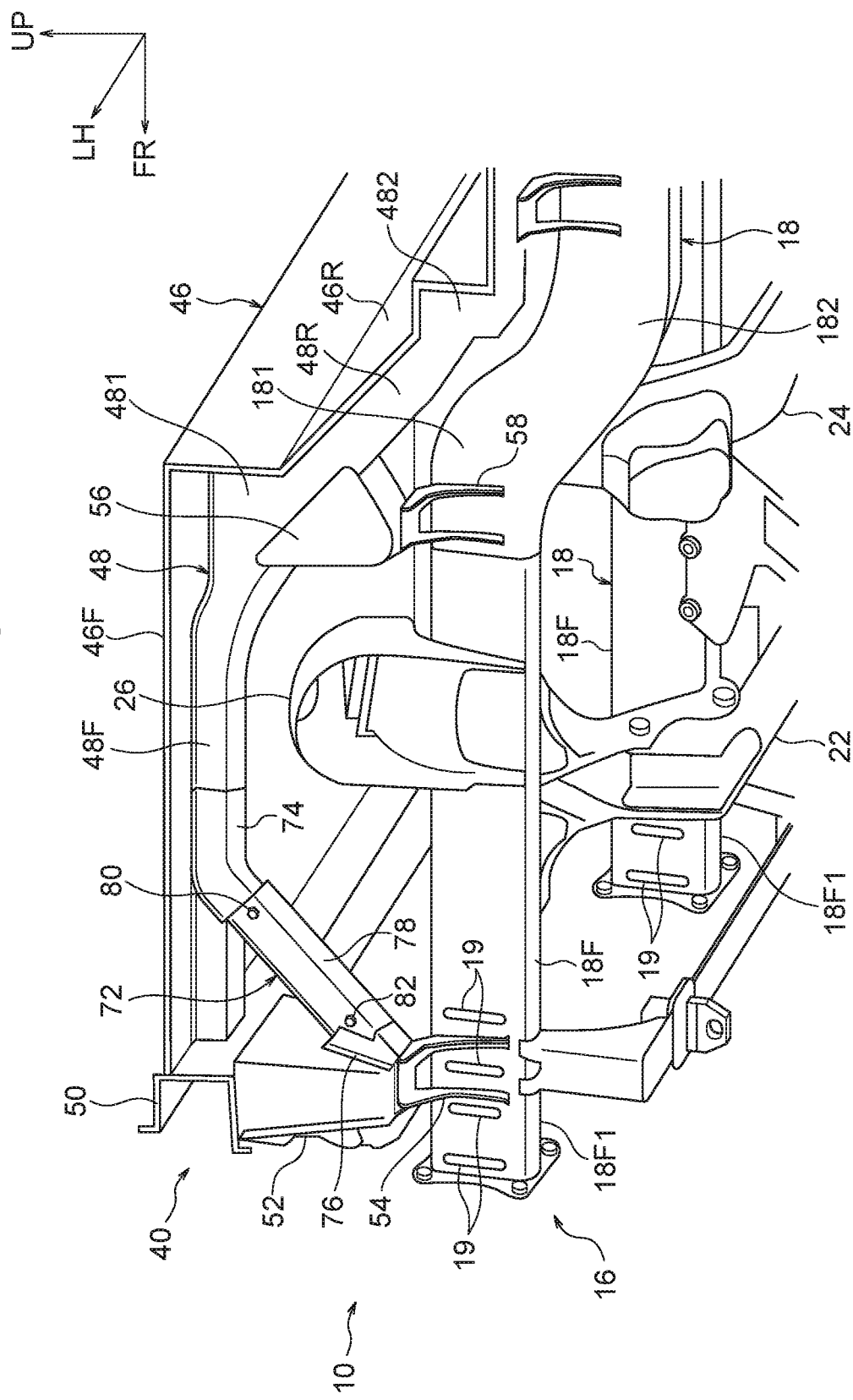
FIG. 4 is a perspective view illustrating part of the configuration of the front section of the vehicle in a state viewed obliquely from a vehicle lower-left side.
Figure 5:
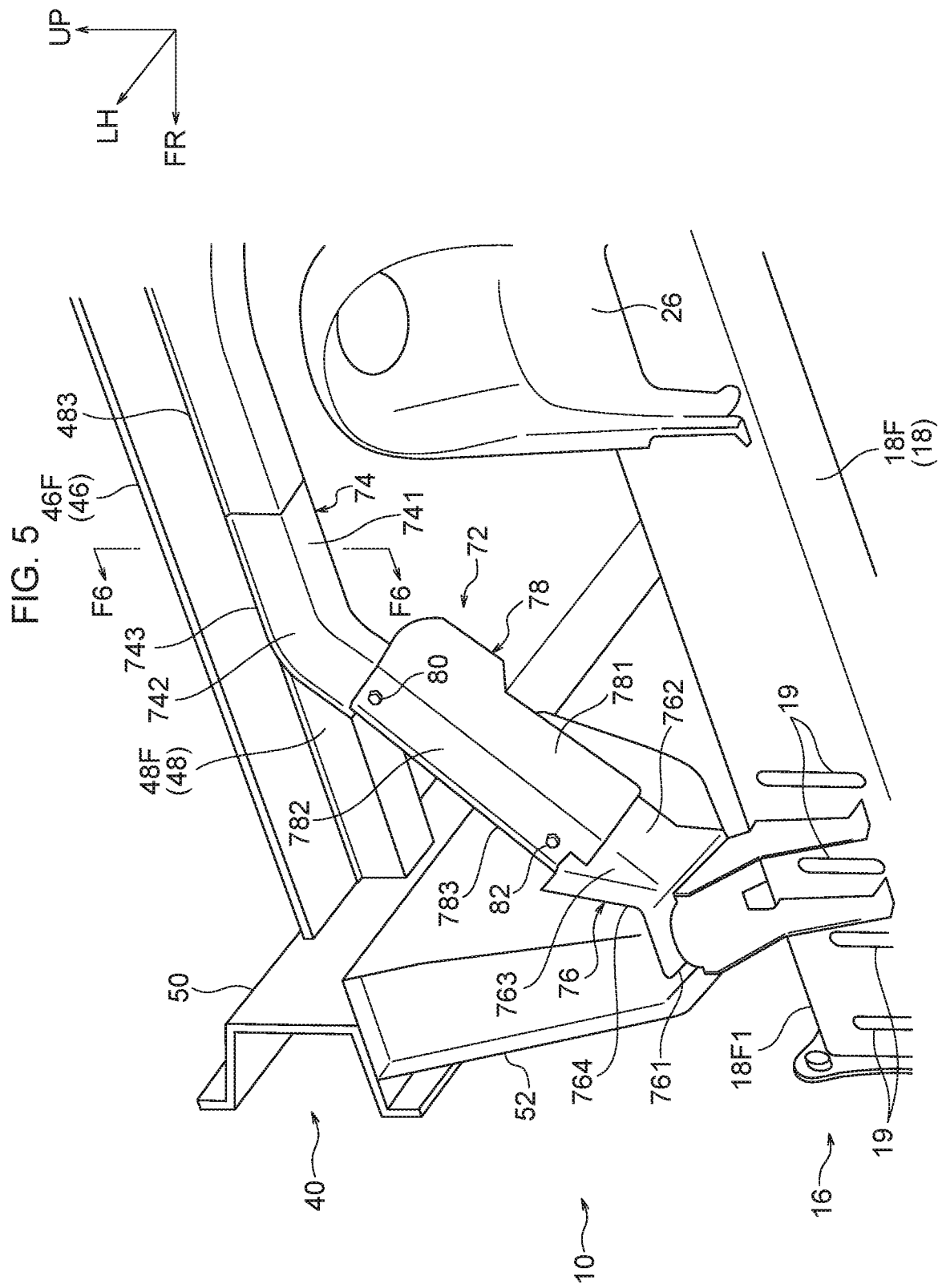
FIG. 5 is an enlarged perspective view illustrating part of the configuration illustrated in FIG. 4.

As illustrated in FIG. 4 and FIG. 5, each of the left and right coupling members 72 includes an upper fixing portion 74 fixed to the front section 48F of the corresponding left or right front side member 48, a lower fixing portion 76 fixed to the left or right front pillar member 52 and the corresponding bracket 54, and an intermediate coupling portion 78 that couples the upper fixing portion 74 and the lower fixing portion 76 together. The upper fixing portion 74, the lower fixing portion 76, and the intermediate coupling portion 78 are each manufactured by for example pressing sheet steel.

As illustrated in FIG. 4 to FIG. 6, the upper fixing portion 74 is formed in an elongated shape with its length along the vehicle front-rear direction, and has a substantially L-shaped cross-section profile as viewed along the front-rear direction. The upper fixing portion 74 includes as integral parts a lower wall 741 overlaid on a lower face of the corresponding front side member 48, a side wall 742 that extends toward the upper side from a vehicle width direction outside end portion of the lower wall 741 and is overlaid on a vehicle width direction outside face of the corresponding front side member 48, and a flange 743 that extends toward the vehicle width direction outside from an upper end portion of the side wall 742 and is overlaid on a lower face of the flange 483 of the corresponding front side member 48. The upper fixing portion 74 is fixed to the corresponding front side member 48 by welding. A front portion side of the upper fixing portion 74 is bent obliquely toward the lower-front side so as to project obliquely toward the vehicle lower-front side with respect to the corresponding front side member 48. The intermediate coupling portion 78 is fixed to this projecting portion.

As illustrated in FIG. 4, FIG. 5, FIG. 7, and FIG. 8, the intermediate coupling portion 78 is formed in an elongated shape, and extends obliquely toward the lower-front side from the projecting portion of the upper fixing portion 74. Similarly to the upper fixing portion 74, the intermediate coupling portion 78 has a substantially L-shaped cross-section profile as viewed along its length direction, and includes as integral parts a lower wall 781, a side wall 782, and a flange 783. The lower wall 781, the side wall 782, and the flange 783 of the intermediate coupling portion 78 are overlaid on the lower wall 741, the side wall 742, and the flange 743 of the upper fixing portion 74. As an example, the side wall 782 of the intermediate coupling portion 78 and the side wall 742 of the upper fixing portion 74 are fastened and fixed together by a bolt 80 (see FIG. 5 and FIG. 7; not allocated a reference numeral in FIG. 1), and a nut (not illustrated in FIG. 7; not allocated a reference numeral in FIG. 2).

As illustrated in FIG. 4 and FIG. 5, the lower fixing portion 76 includes as integral parts a fixing wall 761 sandwiched between a lower face of the corresponding front pillar member 52 and the upper face of the corresponding bracket 54, a sloped wall 762 extending obliquely toward the upper-rear side from a rear end of the fixing wall 761, a side wall 763 extending toward the front side from a vehicle width direction outside end portion of the sloped wall 762, and a flange 764 extending toward the vehicle width direction outside from a front end portion of the side wall 763 with a lower end portion connected to a rear end portion of the fixing wall 761. The fixing wall 761 is fixed to the lower face of the corresponding front pillar member 52 by welding to the front pillar members 52, and is also fixed to the corresponding bracket 54 by bolt-fastening. The sloped wall 762 and the side wall 763 of the lower fixing portion 76 are overlaid on the lower wall 781 and the side wall 782 of the intermediate coupling portion 78. As an example, the side wall 763 of the lower fixing portion 76 and the side wall 782 of the intermediate coupling portion 78 are fastened and fixed by a bolt 82 (see FIG. 5 and FIG. 7; not a allocated reference numeral in FIG. 1), and a nut (not illustrated in FIG. 7; not allocated a reference numeral in FIG. 2).

Each of the coupling members 72 with the above configuration is oriented so as to slope with an upward gradient on progression toward the vehicle rear side at the vehicle rear of the corresponding front pillar member 52, and spans in the form of bracing between the front pillar member 52 and a front-rear direction intermediate portion of the front section 48F of the corresponding front side member 48. The intermediate coupling portion 78 of the coupling member 72 and locations peripheral thereto are formed with an L-shaped cross-section profile (namely, an open cross-section profile). The coupling members 72 are configured so as to more readily undergo plastic deformation under collision load at a time of head-on collision of the vehicle 12 than the front side members 48.

Operation and Effects

Next, explanation follows regarding operation and effects of the present exemplary embodiment.

In the vehicle front section structure 10 with the above configuration, the deformation portions 18F1 are respectively provided to the front end portions of the left and right front side frames 18 that extend along the front-rear direction at both vehicle width direction side sections of the front section of the vehicle 12. The left and right deformation portions 18F1 undergo compression deformation in the front-rear direction in a vehicle head-on collision. The left and right front side members 48 extend along the front-rear direction at the upper sides with respect to the left and right front side frames 18. The front floor panel 46 of the vehicle cabin is supported by these front side members 48. The front sections 48F of the left and right front side members 48 and the corresponding left and right deformation portions 18F1 are connected by the left and right coupling members 72. Thus, the front sections 48F of the left and right front side members 48 are supported by the left and right deformation portions 18F1 through the left and right coupling members 72. This enables the supported rigidity of the front floor panel 46 by the front sections 48F of the left and right front side members 48 under normal circumstances to be increased.

The left and right coupling members 72 are configured so as to more readily undergo plastic deformation under collision load at a time of head-on collision than the left and right front side members 48, and so the coupling members 72 undergo plastic deformation when the left and right deformation portions 18F1 undergo compression deformation. Thus, even in configurations in which the left and right coupling members 72 are connected to the corresponding left and right deformation portions 18F1, the left and right coupling members 72 can be prevented from hindering compression deformation of the left and right deformation portions 18F1. This enables deformation stroke of the left and right deformation portions 18F1 to be set longer in the front-rear direction. Moreover, the left and right coupling members 72 can also be utilized as members to absorb collision load. This enables collision load absorption performance to be improved.

The left and right coupling members 72 are oriented so as to slope with an upward gradient on progression toward the vehicle rear side. This enables upper end portions of the left and right coupling members 72 to be coupled to the front-rear direction intermediate portions of the front sections 48F of the corresponding left and right front side members 48. This enables flexing of the front-rear direction intermediate portions of the front sections 48F to be suppressed under normal circumstances by the left and right coupling members 72. The supported rigidity of the front floor panel 46 by the front sections 48F can be effectively increased as a result.

Moreover, in the present exemplary embodiment, both vehicle width direction end portions of the front cross member 50 that are joined to the front end portions of the left and right front side members 48 are supported by the respective deformation portions 18F1 of the left and right front side frames 18 through the left and right front pillar members 52. The left and right coupling members 72 are disposed at the rear of the left and right front pillar members 52, and span in the form of bracing between the left and right front pillar members 52 and the corresponding left and right front side members 48. This enables the left and right front pillar members 52 and the left and right front side members 48 to be reinforced under normal circumstances by the left and right coupling members 72 serving as bracing.

Furthermore, in the present exemplary embodiment, the respective rear sections 18R, 48R of the left and right front side frames 18 and of the left and right front side members 48 include the kick sections 18R1, 48R that slope with a downward gradient on progression toward the vehicle rear side. Thus, stress concentrates at the bend portions 181, 182, 481, 482 of the kick sections 18R1, 48R at a time of head-on collision of the vehicle 12, and the kick sections 18R1, 48R undergo deformation at these bend portions 181, 182, 481, 482 (see the front side frame 18 and the front side member 48 illustrated by double-dotted dashed lines in FIG. 9). This deformation also enables collision load to be absorbed, thereby enabling collision load absorption performance to be further improved.

Moreover, as a result of this deformation, the left and right front side frames 18 and the left and right front side members 48 are displaced obliquely toward the vehicle upper-rear side in a parallel or substantially parallel state. This enables the front floor panel 46 (not illustrated in FIG. 9) of the vehicle cabin 42 supported by the left and right front side members 48 to be made to retreat obliquely toward the vehicle upper-rear side, namely toward the opposite side to an object that has collided with the vehicle. Occupant safety is better secured as a result.

Moreover, when the above-described deformation occurs, the power unit 30 supported by the left and right front side frames 18 is displaced obliquely toward the vehicle upper-rear side together with the front floor panel 46 of the vehicle cabin 42 supported by the left and right front side members 48. This enables the electronic unit 34 of the power unit 30 to be prevented from crashing into the lower face of the front floor panel 46 of the vehicle cabin 42, thereby enabling damage to the power unit as a result of such a collision to be prevented.

Moreover, in the present exemplary embodiment, the front end portions of the respective kick sections 48R of the left and right front side members 48 are connected in the vehicle width direction by the seat cross member 62 (see FIG. 2 and FIG. 3). This for example enables the deformation at the respective kick sections 48R of the left and right front side members 48 to be stabilized.

Moreover, the seat cross member 62 supports the front end portion of the seat frame 64 that supports the driving seat 66 of the vehicle 12. At a time of head-on collision of the vehicle 12, the left and right front side members 48 undergo deformation at the respective kick sections 48R, and the seat cross member 62 is displaced obliquely toward the vehicle upper-rear side together with the left and right front side members 48 and the seat frame 64. This enables the driving seat 66 supported by the seat frame 64 to be made to retreat toward the opposite side to the colliding object.

Moreover, in the present exemplary embodiment, the left and right front side members 48 each form a closed cross-section profile together with the front floor panel 46, whereas the intermediate coupling portions 78 and so on of the left and right coupling members 72 are formed with an open cross-section profile. Due to this configuration, the left and right coupling members 72 are easily made to more readily undergo plastic deformation under collision load at a time of head-on collision than the left and right front side members 48.

Note that although the left and right coupling members 72 are configured including locations formed with an open cross-section profile in the above exemplary embodiment, there is no limitation thereto, and configuration of the left and right coupling members may be modified as appropriate. For example, the left and right coupling members may be manufactured using a tube-shaped material.

Moreover, although the above exemplary embodiment includes the seat cross member 62 that connects between the front end portions of the respective kick sections 48R of the left and right front side members 48 in the vehicle width direction, and the front end portion of the seat frame 64 is supported by the seat cross member 62, there is no limitation thereto. The installation locations of the cross member that connects between the left and right front side members 48 in the vehicle width direction and of the seat frame may be modified as appropriate.

Moreover, although the driving seat 66 is supported by the seat frame 64 in the above exemplary embodiment, there is no limitation thereto, and the seat supported by the seat frame may be a seat other than the driving seat (such as a front passenger seat).

Moreover, although the above exemplary embodiment includes the power unit 30 that is disposed between the left and right front side frames 18 and is supported by the left and right front side frames 18, there is no limitation thereto. A configuration in which the power unit is installed to a rear section of the vehicle may be employed.

Moreover, although the respective rear sections of the left and right front side frames 18 and the respective rear sections of the left and right front side members 48 include the kick sections 18R1, 48R in the above exemplary embodiment, there is no limitation thereto. For example, the left and right front side frames may each be formed in a straight line along the vehicle front-rear direction.

Moreover, although the left and right coupling members 72 span in the form of bracing between the left and right front pillar members 52 (pillar members) and the left and right front side members 48 in the above exemplary embodiment, there is no limitation thereto. For example, lower end portions of the left and right coupling members may be directly coupled to deformation portions of the left and right front side frames without being coupled through left and right pillar members.

Various other modifications may be implemented within a range not departing from the spirit of the present disclosure. Obviously the scope of rights of the present disclosure is not limited to the above exemplary embodiment.

What is claimed is:

1. A vehicle front section structure, comprising:
   left and right front side frames that extend along a vehicle front-rear direction at both side sections in a vehicle width direction of a front section of a vehicle, with a deformation portion, configured to undergo compression deformation in the vehicle front-rear direction at a time of head-on collision of the vehicle, provided at a front end portion of each of the left and right front side frames;

left and right front side members that extend along the vehicle front-rear direction at a vehicle upper side with respect to the left and right front side frames, and that are configured to support a floor section of a vehicle cabin;

left and right coupling members that connect front sections of the left and right front side members and the respective deformation portions, and are configured so as to more readily undergo plastic deformation under a collision load at a time of head-on collision than the left and right front side members; and a cross member disposed rearward of the left and right coupling members in the vehicle front-rear direction;

wherein respective rear sections of the left and right front side frames and respective rear sections of the left and right front side members each include a kick section that slopes with a downward gradient on progression toward a vehicle rear side;

wherein the cross member connects front end portions of the respective kick sections of the left and right front side members in the vehicle width direction.

2. The vehicle front section structure of claim 1, wherein the left and right coupling members are oriented so as to slope with an upward gradient on progression toward the vehicle rear side.

3. The vehicle front section structure of claim 2, wherein:
a front cross member that extends along the vehicle width direction is joined to front end portions of the left and right front side members;
end portions of the front cross member in the vehicle width direction are respectively supported by the deformation portions of the left and right front side frames via left and right pillar members; and
the left and right coupling members are disposed at the vehicle rear of the left and right pillar members, and span, as bracing, between the left and right pillar members and the corresponding left and right front side members.

4. The vehicle front section structure of claim 1, further comprising a power unit that is disposed between the left and right front side frames and that is supported by the left and right front side frames.

5. The vehicle front section structure of claim 4, wherein the power unit includes a motor and an electronic unit that is disposed at a vehicle upper side with respect to the motor and that is configured to control power supplied to the motor.

6. The vehicle front section structure of claim 1, further comprising a seat frame that is configured to support a seat of the vehicle and has a front end portion supported by the cross member.

7. The vehicle front section structure of claim 6, wherein the seat is a driving seat.

8. The vehicle front section structure of claim 1, wherein:
each of the left and right front side members forms a closed cross-section together with the floor section; and
each of the left and right coupling members includes a portion formed with an open cross-section.

9. The vehicle front section structure of claim 8, wherein the respective coupling members include a portion formed with an L-shaped cross-section profile.

10. The vehicle front section structure of claim 1, wherein the left and right front side frames configure a part of a ladder frame.

11. The vehicle front section structure of claim 1, wherein the left and right coupling members include an upper fixing portion, a lower fixing portion, and an intermediate portion, the upper fixing portions of the left and right coupling members are fixed to respective front sections of the left and right front side members, the upper fixing portions of the left and right coupling members have a substantially L-shaped cross-section profile as viewed along the vehicle front-rear direction, the lower fixing portions of the left and right coupling members are coupled to the deformation portions, and the intermediate portions of the left and right coupling members extend between the upper fixing members and the lower fixing members.

12. The vehicle front section structure of claim 11, wherein the upper fixing portions include a lower wall, a side wall, and a flange, the lower walls are overlaid on a lower face of the respective left and right front side members, the side walls extend toward the vehicle upper side from a vehicle width direction outside end portion of the lower walls, the side walls are overlaid on a vehicle width direction outside face of the respective left and right front side members, and the flanges extend toward the vehicle width direction outside from upper end portions of the respective side walls, the flanges are overlaid on lower faces of flanges of the respective left and right front side members.

* * * * *